United States Patent

[11] 3,603,651

[72] Inventor Charles H. Weber
     Mayville, Wis.
[21] Appl. No. 816,888
[22] Filed Apr. 17, 1969
[45] Patented Sept. 7, 1971
[73] Assignee Maysteel Products Corp.
     Milwaukee, Wis.

[54] MEANS FOR MOUNTING WIPER BLADES ON TELESCOPIC MACHINE TOOL COVERS
5 Claims, 5 Drawing Figs.

[52] U.S. Cl. .................................................. 308/3.5
[51] Int. Cl. ....................................................... F16c 29/00, F16j 13/00
[50] Field of Search ......................................... 160/11; 74/608, 612; 220/8, 24, 41; 92/51, 87; 211/177; 51/268; 308/3.5; 15/257, 256.5, 257.9, 210

[56] References Cited

UNITED STATES PATENTS

| | | | |
|---|---|---|---|
| 3,403,947 | 10/1968 | Johnson ....................... | 308/3.5 |
| 3,515,444 | 6/1970 | Grabner ....................... | 308/3.5 |

FOREIGN PATENTS

| | | | |
|---|---|---|---|
| 63,883 | 5/1955 | France ......................... | 308/3.5 |
| 280,121 | 4/1952 | Switzerland .................. | 15/257.9 |
| 548,996 | 11/1942 | Great Britain................ | 15/257.9 |
| 957,709 | 2/1957 | Germany...................... | 308/3.5 |

Primary Examiner—Walter A. Scheel
Assistant Examiner—Leon G. Machlin
Attorney—Davis, Lucas, Brewer & Brugman ABSTRACT: A method and means for mounting wiper blades on telescopic machine tool covers by a mounting strip formed with a generally S-shaped cross section of opposed loops, the innermost loop being crushed flat against said strip and the outermost loop receiving said wiper blade and being clamped together along the length thereof to secure said wiper blade.

PATENTED SEP 7 1971

3,603,651

INVENTOR
Charles H. Weber
by Davis, Lucas, Brewer
and Brugman  Att'ys

MEANS FOR MOUNTING WIPER BLADES ON TELESCOPIC MACHINE TOOL COVERS

BACKGROUND OF THE INVENTION

This invention related generally to telescopic machine tool covers, and more particularly to a method and means for mounting resilient wiper blades thereon.

Telescopic covers have been developed to protect machine tool slideways against dirt, dust, foreign materials, damage and resultant premature wear. The objective is to avoid expensive repairs and costly production holdups as well as to maintain the high precision of the machine tools and extend their life and increase their value. To achieve a high degree of protection, the telescopic covers of the past have employed a resilient wiper blade, usually plastic, between sections of the telescopic cover. Each wiper blade overlies an inner telescopic section from an outer telescopic section. The method and means of mounting the wiper blade, to date, have required a number of components and expensive manufacturing techniques. For example, past wiper blades have been mounted on each section by means of stainless steel backing clips and bronze strips on the blades, sandwiched behind a separate mounting strip through which rivets are passed for attachment. This required expensive metal finishing of rivet ends and the like to assure a smooth, snag-free surface.

SUMMARY OF THE INVENTION

Therefore, to overcome the foregoing and other difficulties of the prior art, the general object of this invention is to provide a new and improved method and means for mounting resilient wiper blades on sections of telescopic covers. To this end, the present invention provides a mounting strip fixed at the front edge of each outermost telescopic section. The mounting strip may be integral therewith, or fixed thereto in conventional fashion, and as by welding. A generally S-shaped cross section of opposed loops is formed in the strip. The innermost loop is crushed flat and the outer loop receives the wiper blade and is clamped together along the length thereof. The front edge of the outermost loop may be closed inwardly to provide an outermost bearing edge spaced therefrom and near the back of the wiper blade. On the other hand, for a wiper blade of uniform cross section, the outermost loop may include a deep center punch to securely grip the blade.

Thus, one of the objects of this invention is to reduce the number of components necessary to hold a plastic wiper in place on a section of a telescopic cover.

It is an object of this invention to eliminate the necessity of rivets and expensive machining operations thereby required to provide a smooth surface.

Another object of this invention is to provide a method and means for mounting wiper blades to a mounting strip which is integral with the telescopic cover sections.

Yet another object is to provide a method and means for mounting a resilient wiper blade through a mounting strip which may be affixed by welding to a telescopic cover section.

It is still another object to provide durable, secure, and simple means and method for wiper blade mounting which is economical, by utilizing a minimum of conventional, currently available materials and parts that lend themselves to standard mass-production manufacturing techniques.

Further and other objects, and a more complete understanding of the invention may be had by referring to the following description and claims, taken in conjunction with the accompanying drawings:

DESCRIPTION OF THE DRAWINGS

For the purpose of illustrating the invention, there is shown in the drawings forms which are presently preferred, it being understood, however, that this invention is not necessarily limited to the precise arrangements and instrumentalities there shown.

DESCRIPTION OF THE PREFERRED EMBODIMENT

Figure 1:
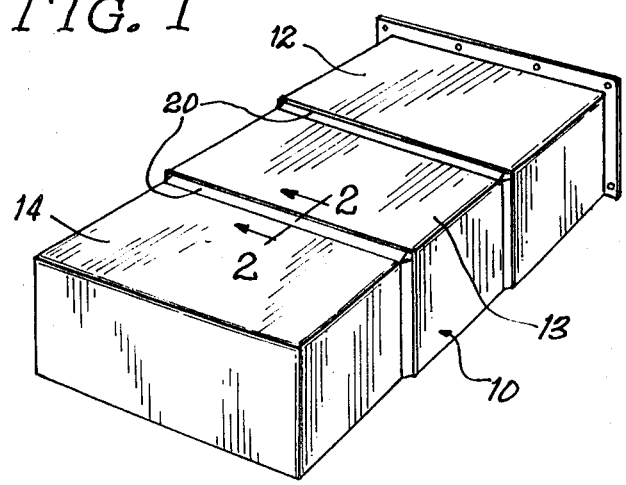
FIG. 1 is a perspective view of a typical machine tool slideway telescopic cover.

Referring now to the drawings in detail, wherein like numerals indicate like elements, there is shown in FIG. 1 an illustration of a typical telescopic cover for a machine tool slideway, designated generally at 10. As shown, the telescopic cover 10 consists of overlying sections 12, 13 and 14. That is, section 12 overlies section 13, which in turn overlies section 14. It is understood, of course, that any multiple of sections may be utilized, depending upon the desired telescopic length, the embodiment shown in FIG. 1 being merely illustrative. Each outer section 12, 13 includes a resilient wiper blade 20 overlying an inner section; for example, section 12 over 13 and section 13 over 14, respectively.

Figure 3:
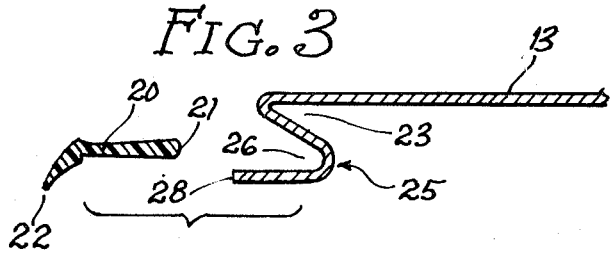
FIG. 3 illustrates the cross section of FIG. 2 with the mounting strip loops open just prior to insertion of the wiper blade and clamping together.
Figure 2:
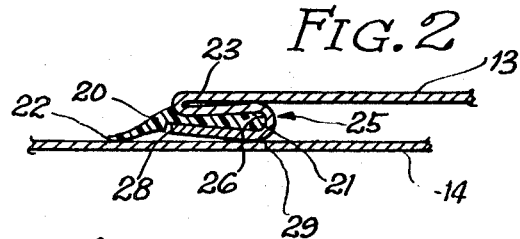
FIG. 2 is an enlarged partial cross section taken along line 2—2 in the direction of the arrows in FIG. 1.

With reference to the detail cross section of FIGS. 2 and 3, it may be visualized that the method and means for mounting are provided by a mounting strip indicated at 25 which is formed into the generally S-shaped cross section shown. It is noted that the mounting strip 25 may be an integral extension of a section wall such as at 13. The S-shaped cross section provides an opposed innermost loop 23 and an outermost loop 26, as shown best in FIG. 3. The wiper 20 is inserted into the outermost loop 26 and the innermost and outermost loops are crushed together to secure the wiper blade along the entire length thereof. That is, with reference to FIG. 2, the innermost loop 23 is crushed flat. The outermost loop 26 is only partially collapsed, tightly against the side of the blade 20 for securement thereof.

Notice that the blade 20 has a cross section decreasing in thickness from its back edge 21 towards its tip 22. The outermost loop is correspondingly shaped having its front edge 28 crushed nearer to the inner loop 23 to secure the blade and also to provide a bearing edge 29 which results at the widest part of said outermost loop 26. The bearing edge 29 provides a smooth rounded surface minimizing friction between the sections 13 and 14, when in contact, respectively. As shown in the cross section of FIG. 2 dust and foreign material are effectively kept out by contact of the wiper tip 21. The weight of the cover 13 may be easily supported by bearing edge 29.

Figure 4:
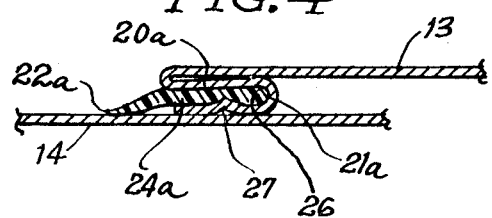
FIG. 4 is a cross section of means and method of mounting.

FIG. 4 shows a variation wherein the wiper blade 20a has a uniform cross section from its back edge 21a to the middle 24a. In this case, the outermost loop 26 is again clamped inwardly thereagainst, and also includes an elongated crease or series of spaced indentations preferably made by punching the material of the loop 26 inwardly, as at 27, to securely grip blade 20a.

Figure 5:
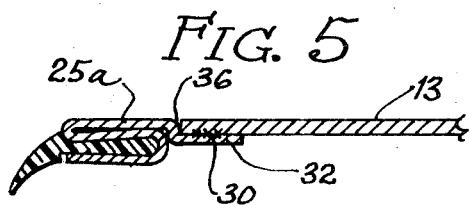
FIG. 5 is a cross section similar to FIG. 2 yet another variation of method and means for mounting.

FIG. 5 shows yet another variation wherein the mounting strip 25a is separate from the wall of a section, such as 13. The means and method of mounting the resilient blade 20 are identical to that shown in FIGS. 2 and 3; however, in this case the separate mounting strip 25a is spot welded, as indicated at 30, to secure the same to section 13. In this variation, the separate strip 25a has an inner depressed portion 32 which accommodates the thickness of the section wall 13, as shown. This allows the mounting strip to be affixed to the section 13 by spot welding techniques well known in the manufacturing art.

In the method of this invention, the steps consist of first forming the mounting strip 25 into a generally S-shaped cross section of opposed loops 23, 26; placing of the back 21 of a wiper blade 20 into the outermost loop 26; and then crushing the loops 23, 26 together, the innermost loop 23 flat, and the outermost loop 26 sufficiently to securely mount the wiper blade 20. In this manner, an efficient and economical means and method is afforded for the mounting of resilient wiper blades to telescopic cover sections.

The present invention may be embodied in other specific forms without departing from the spirit of potential attributes thereof.

I claim:

1. In a cover for protecting machine tool slideways comprising a number of telescopingly related superposed cover sections having wiper means therebetween, the combination comprising: an elongated mounting strip extending along one end margin of each superposing cover section, said strip being formed to provide an open sided loop portion subtending from said end margin and exteriorly engageable with the outer surface of a subadjacent cover section thereby to form sliding bearing means between adjacent cover sections and provide means for maintaining the opposing inner and outer surfaces of such sections in spaced relation throughout telescoping movement of the cover; said loop portion being oriented with the open side thereof accessible proximate said end margin; and resiliently compressible wiper blade means mounted along said strip and comprising a back portion conformably fitted into and compressibly gripped by the interior of said loop portion, and an outer tip portion depending from said back portion and projecting outwardly of said open side for resilient wiping engagement with the said outer surface of said subadjacent cover section.

2. The combination of claim 1, wherein said mounting strip is formed as an integral extension of said end margin.

3. The combination of claim 1 wherein said loop portion terminates in an outer end edge which is turned upwardly to partially enclose the lower margins of said open side thereof, and said wiper blade means is formed with a reduced cross-sectional thickness, intermediate its back and tip portions, which conformably receives said upturned outer end edge whereby said blade means is anchored in said mounting strip.

4. The combination according to claim 1, wherein said strip is separate from said superposing section and has an inner depressed portion opposite said loop portion, said depressed portion accommodating the thickness of a wall of said superposing telescopic section, and means to affix said strip to said wall.

5. The combination according to claim 4, wherein said means are spot welds.